United States Patent
Zhou et al.

(10) Patent No.: US 11,942,036 B2
(45) Date of Patent: Mar. 26, 2024

(54) PIXEL CIRCUIT, PIXEL CIRCUIT DRIVING METHOD AND DISPLAY DEVICE

(71) Applicant: HKC CORPORATION LIMITED, Shenzhen (CN)

(72) Inventors: Renjie Zhou, Shenzhen (CN); Haijiang Yuan, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/145,655

(22) Filed: Dec. 22, 2022

(65) Prior Publication Data

US 2023/0386406 A1  Nov. 30, 2023

(30) Foreign Application Priority Data

May 26, 2022 (CN) .......................... 202210581578.5

(51) Int. Cl.
 *G09G 3/3233* (2016.01)
 *G09G 3/3266* (2016.01)
 *G09G 3/3275* (2016.01)

(52) U.S. Cl.
 CPC ......... *G09G 3/3233* (2013.01); *G09G 3/3266* (2013.01); *G09G 3/3275* (2013.01); *G09G 2300/0814* (2013.01); *G09G 2300/0842* (2013.01); *G09G 2310/0278* (2013.01); *G09G 2320/0233* (2013.01)

(58) Field of Classification Search
 CPC .. G06G 3/3233; G06G 3/3266; G06G 3/3275; G06G 2300/0814; G06G 2310/0278; G06G 2320/0233

See application file for complete search history.

(56) References Cited

U.S. PATENT DOCUMENTS

| | | | | |
|---|---|---|---|---|
| 2016/0267841 A1* | 9/2016 | Yang | .................... | G09G 3/3258 |
| 2019/0019456 A1* | 1/2019 | Chen | .................... | G09G 3/3258 |
| 2019/0073953 A1* | 3/2019 | Kuang | ................. | G09G 3/3233 |
| 2021/0335237 A1* | 10/2021 | Sun | ....................... | G09G 3/3266 |

FOREIGN PATENT DOCUMENTS

| | | |
|---|---|---|
| CN | 104036729 A | 9/2014 |
| CN | 203870950 U | 10/2014 |
| CN | 104700778 A | 6/2015 |
| CN | 108538249 A | 9/2018 |
| CN | 111477165 A | 7/2020 |
| CN | 114267298 A | 4/2022 |

\* cited by examiner

*Primary Examiner* — Premal R Patel
(74) *Attorney, Agent, or Firm* — Hodgson Russ LLP (57) ABSTRACT

A pixel circuit includes a light-emitting element, a capacitor structure, a driving transistor, and first to fourth switching elements. The first switching element connects a data line for providing a data signal to a first terminal of the capacitor structure in response to a first scan signal. The second switching element connects a first terminal of the driving transistor to a control terminal of the driving transistor and a second terminal of the capacitor structure respectively in response to a second scan signal. The third switching element connects a second terminal of the driving transistor to a first terminal of the light-emitting element in response to a third scan signal. The fourth switching element connects a first power signal terminal to the first terminal of the driving transistor in response to a fourth scan signal.

18 Claims, 9 Drawing Sheets

| in First Phase, Turning On First Switching Element, Second Switching Element and Fourth Switching Element with First Scan Signal, Second Scan Signal and Fourth Scan Signal, and Turning Off Third Switching Element with Third Scan Signal | S100 |

↓

| in Second Phase, Turning On First Switching Element, Second Switching Element and Third Switching Element with First Scan Signal, Second Scan Signal and Third Scan Signal, and Turning Off Fourth Switching Element with Fourth Scan Signal | S200 |

↓

| in Third Phase, Turning On First Switching Element with First Scan Signal, and Turning Off Second Switching Element, Third Switching Element and Fourth Switching Element with Second Scan Signal, Third Scan Signal and Fourth Scan Signal | S300 |

↓

| in Fourth Phase, Turning On Fourth Switching Element with Fourth Scan Signal, and Turning Off First Switching Element, Second Switching Element and Third Switching Element with First Scan Signal, Second Scan Signal and Third Scan Signal | S400 |

PIXEL CIRCUIT, PIXEL CIRCUIT DRIVING METHOD AND DISPLAY DEVICE

CROSS-REFERENCE TO RELATED APPLICATIONS

This application claims priority to Chinese Patent Application No. 202210581578.5, filed May 26, 2022, the entire disclosure of which is incorporated herein by reference.

FIELD OF TECHNOLOGY

The present application belongs to the display technology field, in particular to a pixel circuit, a pixel driving method and a display device.

BACKGROUND

Currently, in an OLED display panel, the pixel circuit is affected by process and other reasons, the characteristics of driving transistors driving the light-emitting elements are different, and the threshold voltage of driving transistors is drifted, which makes OLED display uneven.

SUMMARY

There are provided a pixel circuit, a pixel circuit driving method, and a display device according to embodiments of the present disclosure. The technical solution is as below:

According to a first aspect of the present disclosure, there is provided a pixel circuit including:
  a light-emitting element;
  a capacitor structure; a driving transistor;
  a first switching element configured to connect a data line for providing a data signal to a first terminal of the capacitor structure in response to a first scan signal;
  a second switching element configured to connect a first terminal of the driving transistor to a control terminal of the driving transistor and a second terminal of the capacitor structure respectively in response to a second scan signal;
  a third switching element configured to connect a second terminal of the driving transistor to a first terminal of the light-emitting element in response to a third scan signal; and
  a fourth switching element configured to connect a first power signal terminal to the first terminal of the driving transistor in response to a fourth scan signal;
  wherein a second terminal of the light-emitting element is connected to the second terminal of the driving transistor, and the first terminal of the light-emitting element is connected to a ground terminal.

According to a second aspect of the present disclosure, there is provided a pixel driving method for driving a pixel circuit, the method includes:
  in a first phase, turning on a first switching element, a second switching element and a fourth switching element with a first scan signal, a second scan signal and a fourth scan signal, and turning off a third switching element with a third scan signal;
  in a second phase, turning on the first switching element, the second switching element and the third switching element with the first scan signal, the second scan signal and the third scan signal, and turning off the fourth switching element with the fourth scan signal;
  in a third phase, turning on the first switching element with the first scan signal, and turning off the second switching element, the third switching element and the fourth switching element with the second scan signal, the third scan signal and the fourth scan signal; and
  in a fourth phase, turning on the fourth switching element with the fourth scan signal, and turning off the first switching element, the second switching element and the third switching element with the first scan signal, the second scan signal and the third scan signal.

According to a third aspect of the present disclosure, there is provided a display device including a pixel unit and the above pixel circuit, the pixel circuit corresponds to the pixel unit one to one.

It should be understood that the above general description and the following detailed description are exemplary and explanatory only and are not intended to limit the present disclosure.

BRIEF DESCRIPTION OF THE DRAWINGS

The accompanying drawings, which are incorporated in and constitute a part of the specification, illustrate embodiments consistent with the present disclosure and, together with the description, serve to explain the principles of the present disclosure. Obviously, the drawings in the following description are merely some embodiments of the present disclosure, from which other drawings may be obtained without exerting inventive effort by those ordinarily skilled in the art.

DETAILED DESCRIPTION OF THE EMBODIMENTS

The exemplary embodiments will now be described more fully with reference to the accompanying drawings. However, the example embodiments can be implemented in a variety of forms and should not be construed as being limited to the examples set forth herein. Rather, these embodiments are provided so that the present disclosure will be more comprehensive and complete, and the concept of example embodiments will be fully communicated to those skilled in the art.

Further, the described features, structures or characteristics may be incorporated in any suitable manner in one or more embodiments. In the following description many specific details are provided to give a full understanding of the embodiments of the present application. However, those skilled in the art will appreciate that the technical aspects of the present application may be practiced without one or more of the specific details, or other methods, components, devices, steps and the like may be employed. In other instances, the common methods, device, implementations or operations are not shown or described in detail to avoid obscuring aspects of the present application.

The present application is further described below with reference to the accompanying drawings and specific embodiments. It should be noted that the technical features involved in the different embodiments of the present application described below can be combined mutually in case of no conflict. The following embodiments described with reference to the drawings are illustrative and only used to explain the present application, but may not be interpreted as the restrictions of the present application.

Embodiment 1

Figure 1:
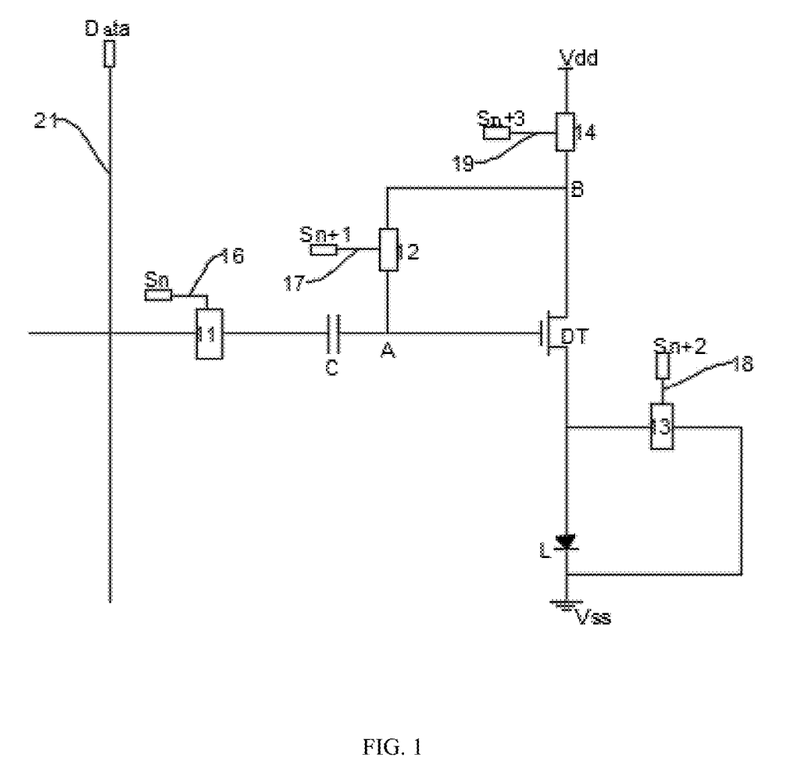
FIG. 1 is a schematic diagram showing connections of modules of a pixel circuit according to embodiment 1 of the present disclosure.
Figure 2:
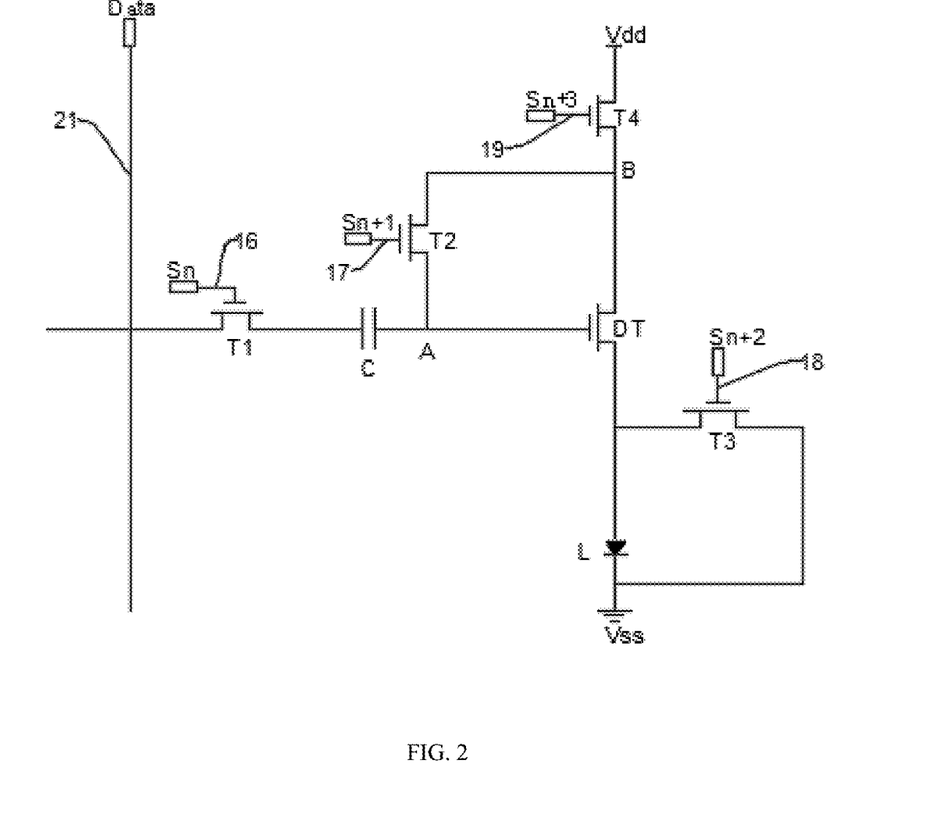
FIG. 2 is a schematic diagram of the pixel circuit according to embodiment 1 of the present disclosure.

The embodiment of the present disclosure provides a pixel circuit for achieving pixel compensation. As shown in FIGS. 1 and 2, the pixel circuit may include a light-emitting element L, a capacitor structure C, a driving transistor DT, a first switching element 11, a second switching element 12, a third switching element 13, and a fourth switching element 14.

It should be understood that both the light-emitting element L and the capacitor structure C have a first terminal and a second terminal, and the driving transistor DT has a control terminal in addition to the first terminal and the second terminal. The relationships among the first to fourth switching elements 14 and the light-emitting element L, the capacitor structure C and the driving transistor DT are as follows.

The first switching unit is operable to connect a data line 21 for supplying a data signal Data to the first terminal of the capacitor structure C in response to the first scan signal Sn.

The second switching element 12 is operable to connect the first terminal of the driving transistor DT to the control terminal of the driving transistor DT to the second terminal of the capacitor structure C, in response to the second scan signal Sn+1.

The third switching element 13 is operable to connect the second terminal of the driving transistor DT to the first terminal of the light-emitting element L in response to the third scan signal Sn+2, the second terminal of the light-emitting element L is connected to the second terminal of the driving transistor DT, and the first terminal of the light-emitting element L is connected to a grounded terminal VSS. A common ground voltage provided by the ground terminal can be 0 or any other reference voltage.

The fourth switching element 14 is operable to connect the first power signal terminal to the first terminal of the driving transistor DT in response to the fourth scan signal Sn+3.

In the embodiment of the present disclosure, four switching elements and the driving transistor DT are controlled to be turned on/off by four scan signals, so that charging, discharging, compensation and luminescence of the circuit can be achieved. The pixel circuit can produce a voltage containing the threshold voltage of the driving transistor DT at the gate of the driving transistor DT in the compensation phase, thereby eliminating the influence of the threshold voltage of the driving transistor DT in the light enable phase, and improving the display uniformity.

Figure 3:
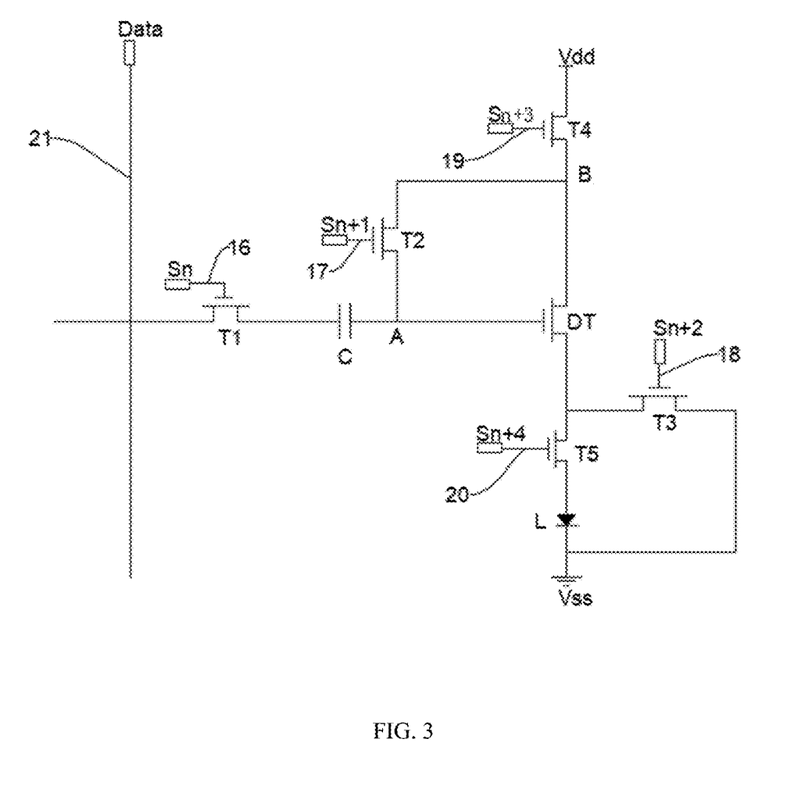
FIG. 3 is a schematic diagram of the pixel circuit having a fifth switching element according to embodiment 1 of the present disclosure.

Further, referring to FIG. 3, the pixel circuit further includes a fifth switching element operable to connect the second terminal of the driving transistor DT and the second terminal of the light-emitting element L in response to the fifth scan signal Sn+4. By arranging the fifth switching element, the light-emitting element L can be effectively prevented from emitting light when the circuit is charged in the first phase, the second phase and the third phase, and the light-emitting element L can be ensured to emit light only in the light enable phase, thus avoiding flickering phenomenon.

As an example, the first scan signal Sn is provided by the Nth row scan line, the second scan signal Sn+1 is supplied by an (N+1)-th row scan signal line, the third scan signal Sn+2 is supplied by the (N+2)-th row scan signal line, the fourth scan signal Sn+3 is supplied by the (N+3)-th row scan signal line, the fifth scan signal Sn+4 is supplied by the (N+4)-th row scan signal line. The scanning in this embodiment is performed from the first row to the last row. That is to say, the first scan signal Sn is scanned before the second scan signal Sn+1, the second scan signal Sn+1 is scanned before the third scan signal Sn+2, the third scan line is scanned before the fourth scan signal Sn+3, and the fourth scan signal Sn+3 is scanned before the fifth scan signal Sn+4. By making the first to fifth scan signals Sn~Sn+4 correspond to five adjacent scan signal lines respectively, the circuit structure design can be simplified, the number of wirings of control signals can be reduced, and the pixel aperture ratio can be increased.

It should be understood that N is a positive integer greater than or equal to 1.

As shown in FIG. 1 to FIG. 3, the first switching element 11 includes a first transistor T1, the second switching element 12 includes a second transistor T2, the third switching element 13 includes a third transistor T3, the fourth switching element 14 includes a fourth transistor T4, and the fifth switching element includes a fifth transistor T5.

It should be understood that the first transistor T1, the second transistor T2, the third transistor T3, the fourth transistor T4, and the fifth transistor T5, like the drive transistor DT, each have a first terminal, a second terminal, and a control terminal. The control terminal of each transistor corresponds to the gate electrode of the transistor, one of the first terminal and the second terminal corresponds to the source electrode of the transistor, and the other corresponds to the drain electrode of the transistor.

As an example, the driving transistor DT, the first transistor T1, the second transistor T2, the third transistor T3, the fourth transistor T4 and the fifth transistor T5 of the embodiment of the present disclosure may all be oxide thin film transistors. That is, the active layer of each transistor can be made of oxides, for example, metal oxide materials such as IGZO (Indium Gallium Zinc Oxide) can be used. Compared with a-Si (amorphous silicon) thin film transistors, IGZO thin film transistors have three major advantages in performance, namely high precision, low power consumption and high touch performance. The main supply targets are electronic display products such as tablet computers and ultrabooks.

In addition, compared with low temperature polysilicon (LTPS) thin film transistors, IGZO thin film transistors do not need to be irradiated by laser to crystallize the semiconductor layer, so the size of the glass substrate can be easily increased. Because the manufacturing process of IGZO thin film transistor is extremely similar to that of a-Si thin film transistor, and the electron mobility of IZGO is high, it can be applied to the production of LCD (Liquid Crystal Display) and OLED display devices.

For example, each transistor may be of a bottom gate type, i.e., the gate of the transistor is located below the active layer (side close to the glass substrate) to allow appropriate thinning of the product, but is not limited thereto, and each transistor may also be of a top gate type, depending on the specific case.

Further, each transistor may be an enhancement or a depletion transistor, which is not specifically limited by the embodiments of the present disclosure.

As an example, all transistors in the pixel circuit may be N-type thin film transistors. That is, the driving transistor DT, the first transistor T1, the second transistor T2, the third transistor T3, the fourth transistor T4 and the fifth transistor T5 may all be N-type thin film transistors. Then the driving voltage of each transistor is a high-level voltage. Based on this, the first power supply signal Vdd provided by the first power supply signal terminal can be a DC high-level signal.

It should be understood that each transistor in the pixel circuit is not limited to the aforementioned N-type thin film transistor but may be a P-type thin film transistor. When each transistor is the P-type thin film transistor, the driving voltage of each transistor may be a low-level voltage. Based on this, the first power supply signal Vdd may be a DC low-level signal.

For example, the light-emitting element L may be a current-driven type light-emitting element L, which is controlled to emit light by the current flowing through the driving transistor DT. For example, the light-emitting element L may be an organic light-emitting diode (OLED), and this pixel circuit may be applied to an OLED display device.

In the pixel circuit, when each transistor is the N-type thin film transistor, the first terminal of the light-emitting element L is the cathode of the OLED, and the second terminal of the light-emitting element L is the anode of the OLED. In the pixel circuit, when each transistor is the P-type thin film transistor, the first terminal of the light-emitting element L is an anode of the OLED, and the second terminal of the light-emitting element L is a cathode of the OLED.

With reference to FIG. 3, the connection relationship of each structure in the pixel circuit will be explained in detail with the examples that each transistor is an N-type thin film transistor, the first power supply signal Vdd is a DC high-level signal, the first terminal of the light-emitting element L is a cathode of the OLED, and the second terminal of the light-emitting element L is an anode of the OLED.

The control terminal of the first transistor T1 is connected to a first scan signal line 16 for supplying the first scan signal Sn, the first terminal of the first transistor T1 is connected to the data line 21, and the second terminal of the first transistor T1 is connected to the first terminal of the capacitor structure C.

The control terminal of the second transistor T2 is connected to the second scan signal line 17 for supplying the second scan signal Sn+1, the first terminal of the second transistor T2 is connected to a first node A, and the second terminal of the second transistor T2 is connected to a second node B.

The control terminal of the third transistor T3 is connected to the third scan signal line 18 for supplying the third scan signal Sn+2, the first terminal of the third transistor T3 is connected to the second terminal of the driving transistor DT, and the second terminal of the third transistor T3 is connected to the first terminal of the light-emitting element L.

The control terminal of the fourth transistor T4 is connected to a fourth scan signal line 19 for supplying the fourth scan signal Sn+3, the first terminal of the fourth transistor T4 is connected to a first power supply signal terminal, the first power supply signal terminal supplies the first power supply signal Vdd, and the second terminal of the fourth transistor T4 is connected to a second node B.

The control terminal of the fifth transistor T5 is connected to the fifth scan signal line 20 for supplying the fifth scan signal Sn+4, the first terminal of the fifth transistor T5 is connected to the second terminal of the driving transistor DT, and the second terminal of the fifth transistor T5 is connected to the second terminal of the light-emitting element L.

The control terminal of the driving transistor DT and the second terminal of the capacitor structure C are both connected to the first node A, and the first terminal of the driving transistor DT is connected to the second node B.

The first terminal of the light-emitting element L is connected to the ground terminal. Specifically, the cathode of the organic light-emitting diode is connected to the ground terminal Vss, and the anode of the organic light-emitting diode is connected to the second terminal of the fifth transistor T5.

Figure 4:
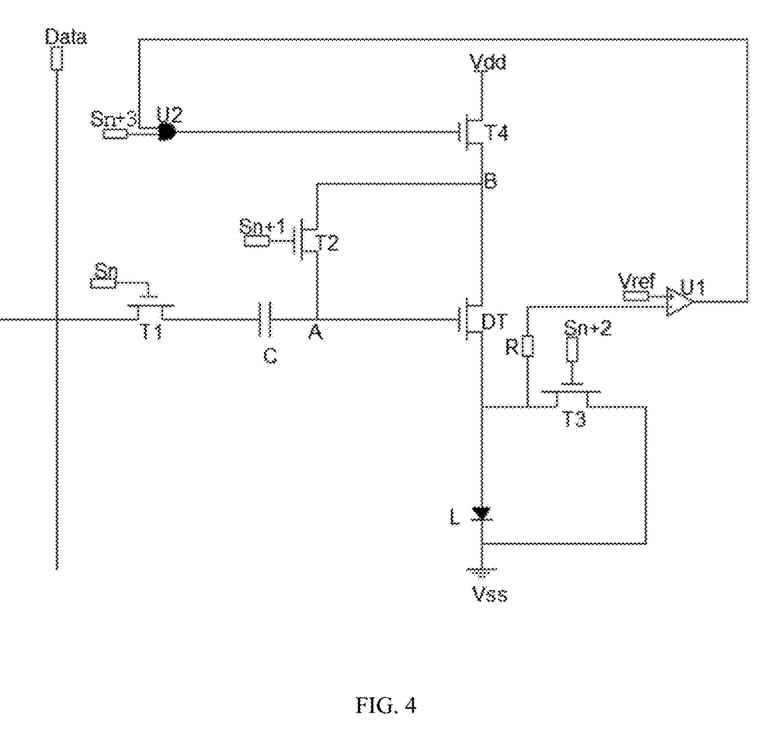
FIG. 4 is a schematic diagram of the pixel circuit according to embodiment 1 of the present disclosure.

Further, referring to FIG. 4, the pixel circuit of the embodiment of the present disclosure further includes a voltage comparator U1, an AND gate circuit U2, and a current-limiting resistor R. The function of voltage comparator U1 is to compare the magnitude of two input voltages and output high or low levels according to the comparison result. The AND gate circuit U2 is the basic logic gate circuit that performs AND calculation. It has multiple inputs and one output. When all inputs are at high level at the same time, the output is at high level, otherwise, the output is at low level. It should be understood that in the present embodiment, the voltage comparator U1 and the AND gate circuit U2 each have a first input terminal, a second input terminal and an output terminal, and the current-limiting resistor has a first terminal and a second terminal.

The first input terminal of the voltage comparator U1 is connected to a reference signal terminal for providing a reference signal Vref, the second input terminal of the voltage comparator U1 is connected to the first terminal of the current-limiting resistor, the output terminal of the voltage comparator U1 is connected to the first input terminal of the AND gate circuit U2, and the second terminal of the current-limiting resistor is connected to the second terminal of the driving transistor DT. The second input terminal of the AND gate circuit U2 is connected to the fourth scan signal line 19, and the output terminal of the AND gate circuit U2 is connected to the control terminal of the fourth transistor T4.

In this embodiment, the first input terminal of the voltage comparator U1 is a non-inverting terminal of the voltage comparator U1, and the second input terminal of the voltage comparator U1 is an inverting terminal of the voltage comparator U1. In a default state, the voltage comparator U1 outputs high level. When a large current passes, the voltage at the second input terminal increases, and when it is greater than the reference voltage, the output terminal of the voltage comparator U1 outputs low level, at which time, regardless of whether the fourth scan signal Sn+3 is at high level or low level, the fourth transistor T4 is always turned off, and the circuit is turned off without current, thereby protecting the circuit.

Based on this, the pixel circuit of the embodiment of the present disclosure adopts a 5T1C structure to achieve the charging, discharging, compensation and luminance of the circuit in the first to fourth phases. In this way, a voltage protecting the threshold voltage can be produced at the gate of the driving transistor DT before light emitting, thereby compensating the threshold voltage of the driving transistor DT when the light-emitting element L emits light in the fourth phase, thereby avoiding the occurrence of a threshold voltage drift, and improving the display uniformity.

The pixel circuit may include a light-emitting element, a capacitor structure, a driving transistor and first to fourth switching elements. The scan signal controls on/off of the four switching elements and the driving transistor. The pixel circuit can produce a voltage including a threshold voltage at the gate of the driving transistor in the form of autonomous discharge in the second phase and the third phase, so as to offset the threshold voltage of the driving transistor itself in the light enable phase, thereby compensating for the threshold voltage drift of the driving transistor, and improving the display uniformity.

Embodiment 2

Figure 5:
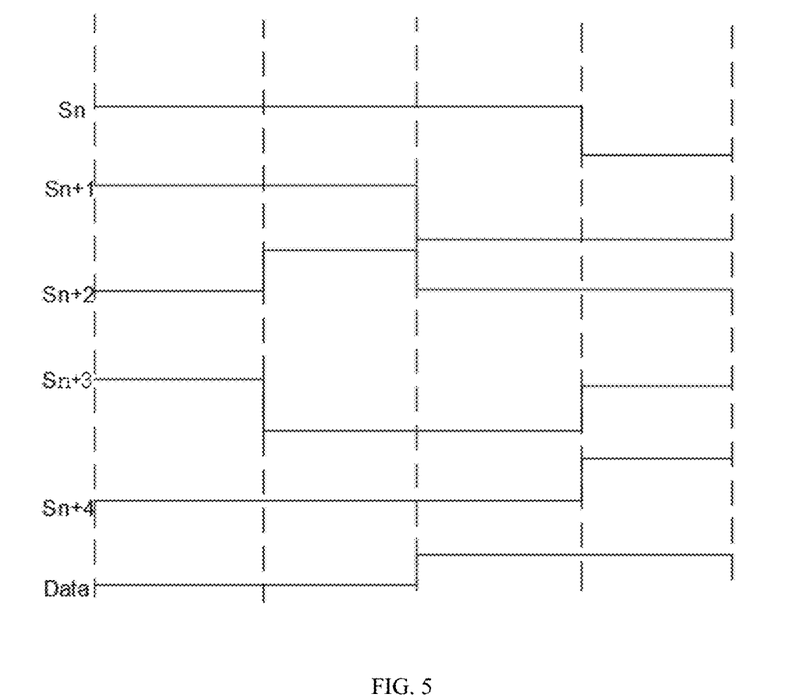
FIG. 5 is a driving timing diagram of the pixel circuit according to embodiment 2 of the present disclosure.
Figure 6:
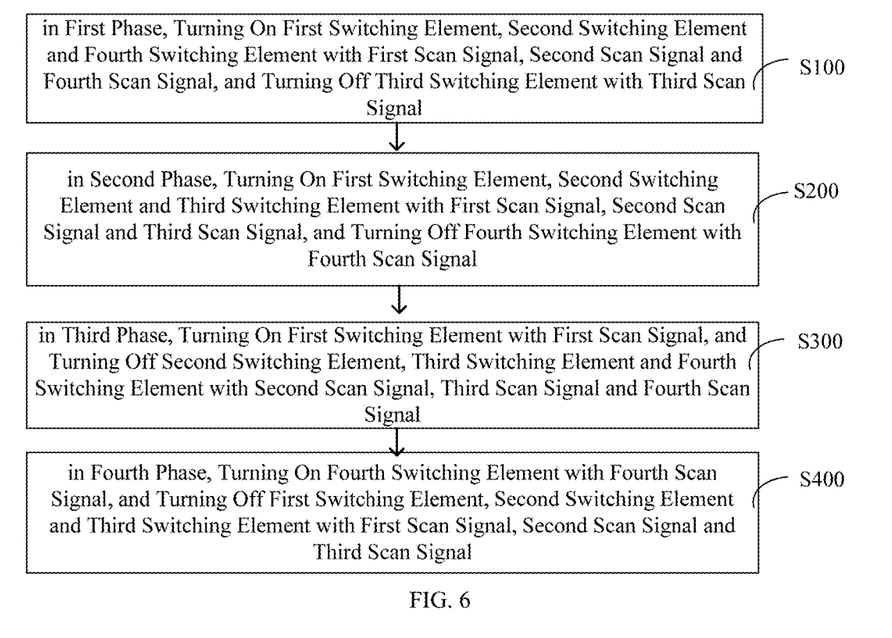
FIG. 6 is a flowchart of a pixel driving method according to embodiment 2 of the present disclosure.

Based on the pixel circuit mentioned in embodiment 1, embodiment 2 of the present disclosure further provides a pixel driving method. referring to FIG. 3, FIG. 5 and FIG. 6, the pixel driving method may include:

Step S100, in a first phase, the first switching element 11, the second switching element 12 and the fourth switching element 14 are turned on with the first scan signal Sn, the second scan signal Sn+1 and the fourth scan signal Sn+3, and the third switching element 13 and the fifth switching element are turned off with the third scan signal Sn+2 and the fifth scan signal Sn+4;

Step S200, in a second phase, the first switching element 11, the second switching element 12 and the third switching element 13 are turned on with the first scan signal Sn, the second scan signal Sn+1 and the third scan signal Sn+2, and the fourth switching element 14 and the switching element T5 are turned off with the fourth scan signal Sn+3 and the fifth scan signal Sn+4;

Step S300, in a third phase, the first switching element 11 is turned on with the first scan signal Sn, and the second switching element 12, the third switching element 13, the fourth switching element 14 and the fifth switching element are turned off with the second scan signal Sn+1, the third scan signal Sn+2, the fourth scan signal Sn+3 and the fifth scan signal Sn+4, respectively;

Step S400, in a fourth phase, the fourth switching element 14 and the fifth switching element are turned on with the fourth scan signal Sn+3 and the fifth scan signal Sn+4, and the first switching element 11, the second switching element 12 and the third switching element 13 are turned off with the first scan signal Sn, the second scan signal Sn+1 and the third scan signal Sn+2.

The pixel driving method corresponding to the pixel circuit in FIG. 2 will be described in detail with reference to the operation timing diagram of the pixel circuit shown in FIG. 5.

The operation timing diagram of the pixel circuit shown in FIG. 5 shows the level states of the first scan signal Sn, the second scan signal Sn+1, the third scan signal Sn+2, the fourth scan signal Sn+3, the fifth scan signal Sn+4, and the data signal Data in the four phases.

Figure 7:
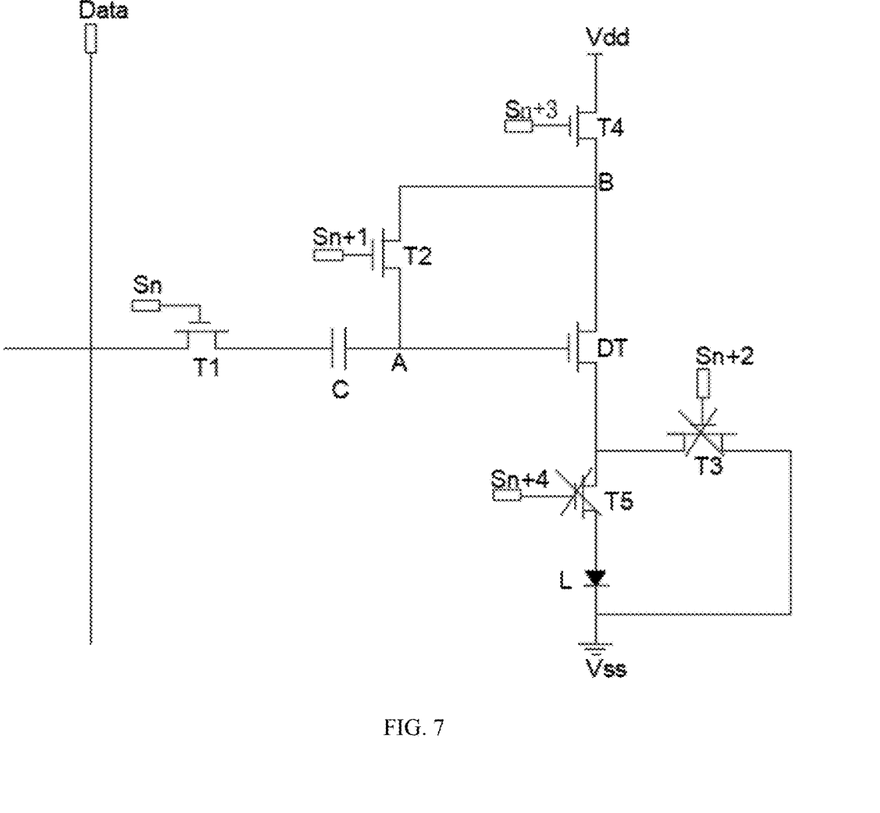
FIG. 7 shows an equivalent circuit diagram in a first phase in FIG. 3.

Referring to FIG. 7, in the first phase, the capacitor structure is charged. Referring to FIGS. 5 and 6, the first scan signal Sn, the second scan signal Sn+1, and the fourth scan signal Sn+3 are at high level, and the third scan signal Sn+2, the fifth scan signal Sn+4, and the data signal Data are at low level, so that the first transistor T1, the second transistor T2, and the fourth transistor T4 are in an on state, and the third transistor T3 and the fifth transistor T5 are in an off state. Based on this, the data signal Data is input a low level to the first terminal of the capacitor structure C, and the first power signal Vdd is applied to the first node A through the fourth transistor T4 and the second transistor T2 to charge the capacitor structure C, that is, the first node A writes the first power signal, VA=Vdd, and VA is the voltage at the first node A.

Figure 8:
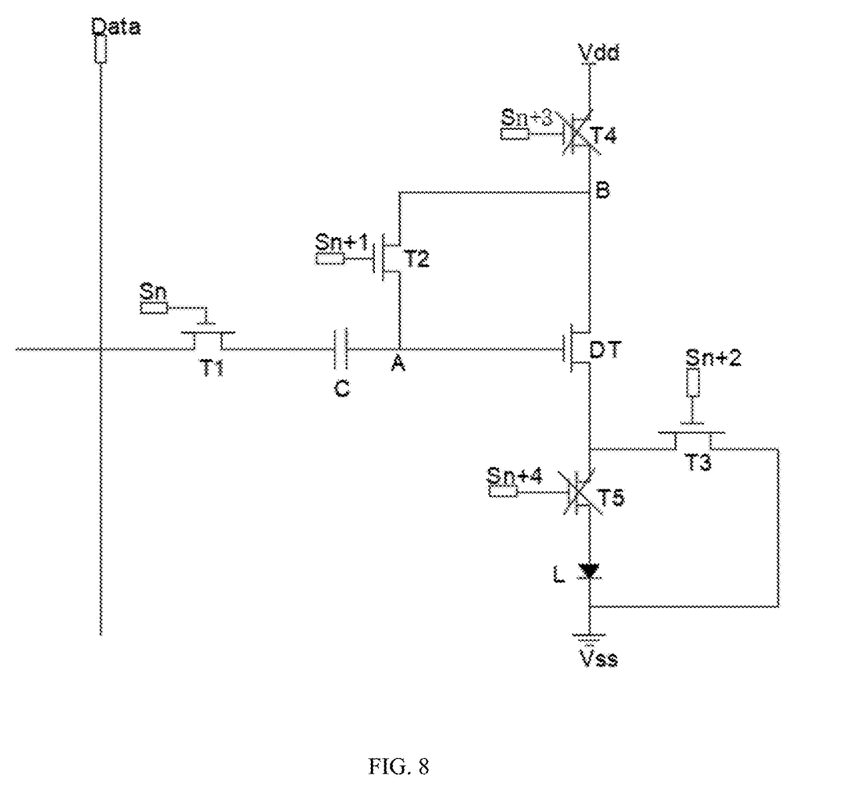
FIG. 8 shows an equivalent circuit diagram in a second phase in FIG. 3.

Referring to FIG. 8, in the second phase, the circuit is discharged, The first scan signal Sn, the second scan signal Sn+1, and the third scan signal Sn+2 are at high level, the fourth scan signal Sn+3, the fifth scan signal Sn+4, and the data signal Data are at low level, so that the first transistor T1, the second transistor T2, and the third transistor T3 are in an on state, and the fourth transistor T4 and the fifth transistor T5 are in an off state. Based on this, the data signal Data continues to be input a low level to the first terminal of the capacitor structure C, the second terminal of the driving transistor DT is grounded due to the conduction of the third transistor T3. The voltage of the first node A is discharged along the second transistor T2, the driving transistor DT and the third transistor T3. Since the discharge path passes through the driving transistor DT, the discharging will be terminal when the voltage of the first node A is discharged to the case where VGS=Vth, at which time, due to the voltage stabilization of the capacitor structure C, the voltage of the first node A is VA−VS=VGS=Vth, and then VS=0, that is, VA=Vth remains unchanged. VS is the voltage of the second terminal of the driving transistor, and Vth is the threshold voltage of the driving transistor.

Figure 9:
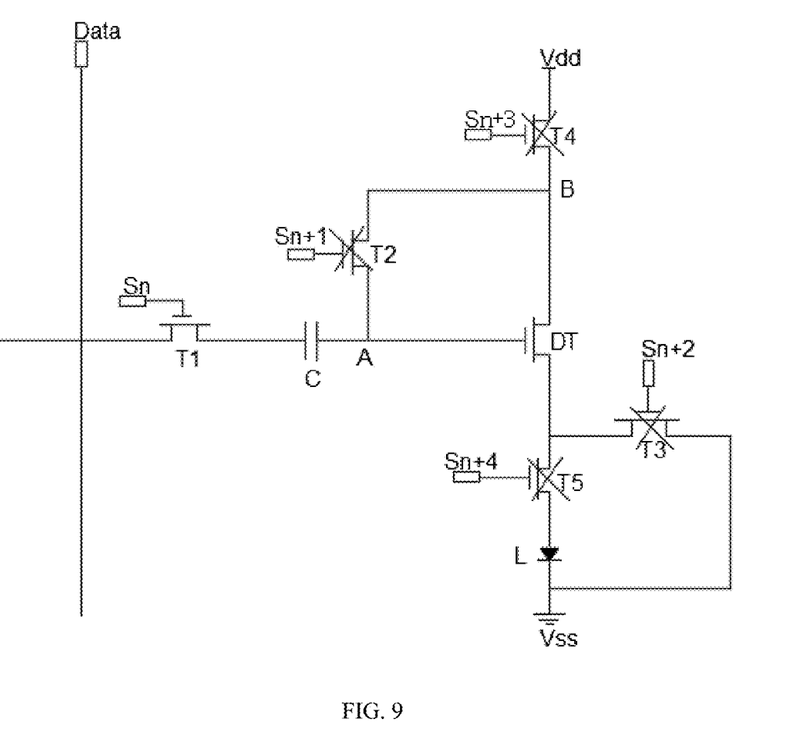
FIG. 9 shows an equivalent circuit diagram in a third phase in FIG. 3.

Referring to FIG. 9, in the third phase, the first scan signal Sn and the data signal Data are at high level, and the second scan signals Sn+1 to the fifth scan signals Sn+4 are at low level, so that the first transistor T1 is in an on state, and the second transistors T2 to the fifth transistors T5 are in an off state. Based on this, the capacitor structure C is charged with the data signal Data through the first transistor T1, and the capacitor structure C charges VData. At this time, the voltage VA of the first node A euqals VData plus Vth, due to the voltage stabilization effect of the capacitor structure C, VA=VData+Vth remains unchanged and a voltage including the threshold voltage of the driving transistor is produced at the gate of the driving transistor to compensate the threshold voltage of the driving transistor.

Figure 10:
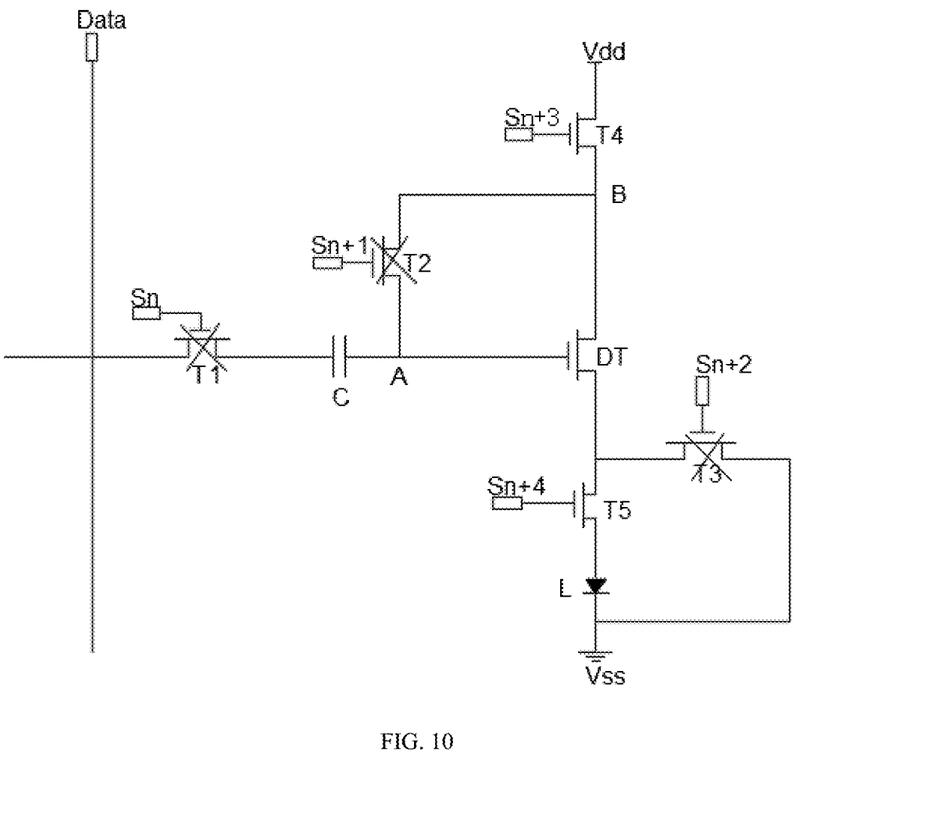
FIG. 10 shows an equivalent circuit diagram in a fourth phase in FIG. 3.

Referring to FIG. 10, in the fourth phase, the fourth scan signal Sn+3 and the fifth scan signal Sn+4 are high at level, the first scan signal Sn to the third scan signal Sn+2 are at low level, the data signal Data may be at high level or low level so that the fourth transistor T4 and the fifth transistor T5 and the driving transistor DT are in the on state, the first transistor T1 to the third transistor T3 are all in the off state, the light-emitting element L thereby emits light. Since the voltage VA of the first node A equal VData plus Vth at the end of the third phase, that is, the gate voltage of the driving transistor DT is equal to the voltage of the first node A and already contains Vth, thereby compensating the threshold voltage Vth of the driving transistor DT, so that the drift of the threshold voltage of the driving transistor DT does not affect the driving current of the light-emitting element L, and the uniformity and stability of the driving current are ensured. Thus the brightness of the display device can be more uniform, the afterimage generation can be reduced, and the display effect can be enhanced.

Embodiment 3

Based on the contents of embodiment 1, embodiment 3 further provides a display device, which can be an OLED display device. The display device may include a pixel unit and a pixel circuit in the embodiment. The pixel circuit corresponds to the pixel unit one to one. Since this embodiment has the pixel circuit shown in the first embodiment, the present display device has the beneficial effects of the pixel circuit in the first embodiment and will not be described here.

The display device of the embodiment of the present disclosure can be an AMOLED (Active-matrix organic light-emitting diode) display, which has many advantages such as thin body, power saving, bright color, strong image quality and the like, and is widely used. OLED TV, mobile phone, laptop screen and the like are gradually dominated in the flat panel display field.

In addition, the terms of "first", "second" are for descriptive purposes only and cannot be construed as indicating or implying relative importance or implying the number of the indicated technical features. Thus, features defined with "first" and "second" may explicitly or implicitly include one or more of the features. In the description of the present application, "multiple" means two or more unless otherwise expressly specified.

In the present application, the terms "install", "connect" and the like are to be understood in a broad sense, unless otherwise expressly specified and limited, for example, it can be a fixed connection, may also be a detachable connection, or be integral; it can be a mechanical connection, can also be an electrical connection; it can be directly connection or indirectly connection through an intermediate medium, or it can be an internal connection of two elements or an interactive relationship of two elements. For those ordinarily skilled in the art, the specific meanings of the above terms in the present application will be understood according to the specific circumstances.

In the content of the description, illustrations of the reference terms "some embodiments," "example," etc. mean that specific features, structures, materials, or characteristics described in connection with the embodiment or example are encompassed in at least one embodiment or example of the present application. In this description, the schematic formulation of the above terms need not be directed to the same embodiments or examples. Further, the specific features, structures, materials or characteristics described may be combined in a suitable manner in any one or more embodiments or examples. Further, without contradicting one another, those skilled in the art may connect and combine different embodiments or examples described in this description and features of different embodiments or examples.

Although embodiments of the present application have been shown and described above, it will be understood that the above-mentioned embodiments are exemplary and cannot be construed as limiting the present application. Those of ordinary skill in the art may make changes, variations, alternatives and modifications to the above-mentioned embodiments within the scope of the present application. Therefore, any changes or modifications made in accordance with the claims and descriptions of the present application should fall within the scope of the patent of the present application.

What is claimed is:

1. A pixel circuit comprising:
a light-emitting element;
a capacitor structure;
a driving transistor;
a first switching element configured to connect a data line for providing a data signal to a first terminal of the capacitor structure in response to a first scan signal;
a second switching element configured to connect a first terminal of the driving transistor to a control terminal of the driving transistor and a second terminal of the capacitor structure respectively in response to a second scan signal;
a third switching element configured to connect a second terminal of the driving transistor to a first terminal of the light-emitting element in response to a third scan signal;
a fourth switching element configured to connect a first power signal terminal to the first terminal of the driving transistor in response to a fourth scan signal; and
a fifth switching element configured to connect the second terminal of the driving transistor and a second terminal of the light-emitting element in response to a fifth scan signal;
wherein the first terminal of the light-emitting element is connected to a ground terminal.

2. The pixel circuit according to claim 1, wherein the first to fifth switching elements correspond to be a first transistor, a second transistor, a third transistor, a fourth transistor and a fifth transistor, respectively;
wherein a control terminal of the first transistor is connected to a first scan signal line for providing the first scan signal, a first terminal of the first transistor is connected to the data line, and a second terminal of the first transistor is connected to the first terminal of the capacitor structure;
wherein a control terminal of the second transistor is connected to a second scan signal line for providing the second scan signal, a first terminal of the second transistor is connected to a first node, and a second terminal of the second transistor is connected to a second node;
wherein a control terminal of the third transistor is connected to a third scan signal line for providing the third scan signal, a first terminal of the third transistor is connected to a second terminal of the driving transistor, and a second terminal of the third transistor is connected to the first terminal of the light-emitting element;
wherein a control terminal of the fourth transistor is connected to a fourth scan signal line for providing the fourth scan signal, a first terminal of the fourth transistor is connected to the first power signal terminal, and a second terminal of the fourth transistor is connected to the second node;
wherein a control terminal of the fifth transistor is connected to a fifth scan signal line for supplying the fifth scan signal, a first terminal of the fifth transistor is connected to a second terminal of the driving transistor, and a second terminal of the fifth transistor is connected to the second terminal of the light-emitting element; and
wherein the control terminal of the driving transistor and the second terminal of the capacitor structure are connected to the first node, and the first terminal of the driving transistor is connected to the second node.

3. The pixel circuit according to claim 2, wherein the driving transistor and the first transistor to the fifth transistor are N-type thin film transistors; and
  wherein the first power supply signal provided by the first power signal terminal is a DC high-level signal.

4. The pixel circuit according to claim 2, wherein the pixel circuit further comprises:
  a current-limiting resistor;
  an AND gate circuit, wherein a second input terminal of the AND gate circuit is connected to the fourth scan signal line, and an output terminal of the AND gate circuit is connected to a control terminal of the fourth transistor; and
  a voltage comparator, wherein a first input terminal of the voltage comparator is connected to a reference signal terminal for providing a reference signal, a second input terminal of the voltage comparator is connected to a first terminal of the current-limiting resistor, an output terminal of the voltage comparator is connected to a first input terminal of the AND gate circuit, and a second terminal of the current-limiting resistor is connected to the second terminal of the driving transistor.

5. The pixel circuit according to claim 4, wherein the first input terminal of the voltage comparator is a non-inverting terminal of the voltage comparator, and the second input terminal of the voltage comparator is an inverting terminal of the voltage comparator.

6. The pixel circuit according to claim 2, wherein each transistor is of a bottom gate type.

7. The pixel circuit according to claim 2, wherein each transistor in the pixel circuit is N-type thin film transistor or P-type thin film transistor.

8. The pixel circuit according to claim 1, wherein the first scan signal is provided by an Nth row scan signal line, the second scan signal is provided by an (N+1)-th row scan signal line, the third scan signal is provided by an (N+2)-th row scan signal line, the fourth scan signal is provided by an (N+3)-th row scan signal line, and the fifth scan signal is provided by an (N+4)-th row scan signal line, where N is a positive integer greater than or equal to 1; and
  wherein the pixel circuit is scanned from the first row to a last row.

9. A pixel driving method for driving a pixel circuit, comprising:
  in a first phase, turning on a first switching element, a second switching element and a fourth switching element with a first scan signal, a second scan signal and a fourth scan signal, and turning off a third switching element with a third scan signal;
  in a second phase, turning on the first switching element, the second switching element and the third switching element with the first scan signal, the second scan signal and the third scan signal, and turning off the fourth switching element with the fourth scan signal;
  in a third phase, turning on the first switching element with the first scan signal, and turning off the second switching element, the third switching element and the fourth switching element with the second scan signal, the third scan signal and the fourth scan signal; and
  in a fourth phase, turning on the fourth switching element with the fourth scan signal, and turning off the first switching element, the second switching element and the third switching element with the first scan signal, the second scan signal and the third scan signal.

10. The pixel driving method according to claim 9, wherein the pixel circuit further comprises a fifth switching element for connecting a second terminal of a driving transistor to a second terminal of a light-emitting element in response to a fifth scan signal;
  in the first phase to the third phase, the fifth switching element is turned off with the fifth scan signal; and
  in the fourth phase, the fifth switching element is turned on with the fifth scan signal.

11. The pixel driving method according to claim 10, wherein a first power supply signal provided by the first power signal terminal is a DC high-level signal;
  wherein in the first phase, the first scan signal, the second scan signal and the fourth scan signal are at high level, and the third scan signal, the fifth scan signal and the data signal are at low level;
  in the second phase, the first scan signal, the second scan signal and the third scan signal are at high level, and the fourth scan signal, the fifth scan signal and the data signal are at low level;
  in the third phase, the first scan signal and the data signal are at high level, and the second scan signal, the third scan signal, the fourth scan signal and the fifth scan signal are at low level; and
  in the fourth phase, the data signal, the fourth scan signal and the fifth scan signal are at high level, and the first scan signal, the second scan signal and the third scan signal are at low level.

12. A display device comprising:
  a pixel unit; and
  a pixel circuit corresponding to the pixel unit one to one, comprising:
    a light-emitting element;
    a capacitor structure;
    a driving transistor;
    a first switching element configured to connect a data line for providing a data signal to a first terminal of the capacitor structure in response to a first scan signal;
    a second switching element configured to connect a first terminal of the driving transistor to a control terminal of the driving transistor and a second terminal of the capacitor structure respectively in response to a second scan signal;
    a third switching element configured to connect a second terminal of the driving transistor to a first terminal of the light-emitting element in response to a third scan signal;
    a fourth switching element configured to connect a first power signal terminal to the first terminal of the driving transistor in response to a fourth scan signal; and
    a fifth switching element configured to connect the second terminal of the driving transistor and a second terminal of the light-emitting element in response to a fifth scan signal;
  wherein the first terminal of the light-emitting element is connected to a ground terminal.

13. The display device according to claim 12, wherein the first to fifth switching elements correspond to be a first transistor, a second transistor, a third transistor, a fourth transistor and a fifth transistor, respectively;
  wherein a control terminal of the first transistor is connected to a first scan signal line for providing the first scan signal, a first terminal of the first transistor is connected to the data line, and a second terminal of the first transistor is connected to the first terminal of the capacitor structure;
  wherein a control terminal of the second transistor is connected to a second scan signal line for providing the second scan signal, a first terminal of the second transistor is connected to a first node, and a second terminal of the second transistor is connected to a second node;

wherein a control terminal of the third transistor is connected to a third scan signal line for providing the third scan signal, a first terminal of the third transistor is connected to a second terminal of the driving transistor, and a second terminal of the third transistor is connected to the first terminal of the light-emitting element;

wherein a control terminal of the fourth transistor is connected to a fourth scan signal line for providing the fourth scan signal, a first terminal of the fourth transistor is connected to the first power signal terminal, and a second terminal of the fourth transistor is connected to the second node;

wherein a control terminal of the fifth transistor is connected to a fifth scan signal line for supplying the fifth scan signal, a first terminal of the fifth transistor is connected to a second terminal of the driving transistor, and a second terminal of the fifth transistor is connected to the second terminal of the light-emitting element; and wherein the control terminal of the driving transistor and the second terminal of the capacitor structure are connected to the first node, and the first terminal of the driving transistor is connected to the second node.

14. The display device according to claim 13, wherein the driving transistor and the first transistor to the fifth transistor are N-type thin film transistors; and wherein the first power supply signal provided by the first power signal terminal is a DC high-level signal.

15. The display device according to claim 13, wherein the pixel circuit further comprises:

a current-limiting resistor;

an AND gate circuit, wherein a second input terminal of the AND gate circuit is connected to the fourth scan signal line, and an output terminal of the AND gate circuit is connected to a control terminal of the fourth transistor; and a voltage comparator, wherein a first input terminal of the voltage comparator is connected to a reference signal terminal for providing a reference signal, a second input terminal of the voltage comparator is connected to a first terminal of the current-limiting resistor, an output terminal of the voltage comparator is connected to a first input terminal of the AND gate circuit, and a second terminal of the current-limiting resistor is connected to the second terminal of the driving transistor.

16. The pixel circuit according to claim 15, wherein the first input terminal of the voltage comparator is a non-inverting terminal of the voltage comparator, and the second input terminal of the voltage comparator is an inverting terminal of the voltage comparator.

17. The display device according to claim 13, wherein each transistor is of a bottom gate type.

18. The pixel circuit according to claim 12, wherein the first scan signal is provided by an Nth row scan signal line, the second scan signal is provided by an (N+1)-th row scan signal line, the third scan signal is provided by an (N+2)-th row scan signal line, the fourth scan signal is provided by an (N+3)-th row scan signal line, and the fifth scan signal is provided by an (N+4)-th row scan signal line, where N is a positive integer greater than or equal to 1; and wherein the pixel circuit is scanned from the first row to a last row.

\* \* \* \* \*